(12) United States Patent
Severinsson

(10) Patent No.: US 6,913,123 B2
(45) Date of Patent: *Jul. 5, 2005

(54) METHOD AND DEVICE FOR SERVICE BRAKING

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 21 days.

This patent is subject to a terminal disclaimer.

(21) Appl. No.: 10/600,732

(22) Filed: Jun. 20, 2003

(65) Prior Publication Data
US 2004/0060783 A1 Apr. 1, 2004

Related U.S. Application Data

(63) Continuation of application No. PCT/SE01/02807, filed on Dec. 18, 2001.

(30) Foreign Application Priority Data
Dec. 20, 2000 (SE) .............................................. 0004714

(51) Int. Cl.[7] ............................................. F16D 65/36
(52) U.S. Cl. ..................................... 188/156; 188/167
(58) Field of Search ................................ 188/156, 157, 188/158, 161, 162, 170, 171, 166, 167, 173

(56) References Cited

U.S. PATENT DOCUMENTS

| | | | | |
|---|---|---|---|---|
| 3,217,843 A | * | 11/1965 | Newell et al. .............. | 188/173 |
| 3,385,636 A | * | 5/1968 | Cruse .............................. | 303/9 |
| 3,693,759 A | * | 9/1972 | Schindel .................... | 185/40 R |
| 4,546,296 A | * | 10/1985 | Washbourn et al. ......... | 188/162 |
| 4,760,895 A | * | 8/1988 | Wickham .................... | 188/173 |
| 4,895,227 A | * | 1/1990 | Grenier et al. .............. | 188/156 |
| 4,953,668 A | * | 9/1990 | Severinsson ................ | 188/158 |
| 4,953,669 A | * | 9/1990 | Severinsson ................ | 188/171 |
| 5,180,038 A | * | 1/1993 | Arnold et al. .............. | 188/171 |
| 5,388,674 A | * | 2/1995 | Severinsson ................ | 188/171 |
| 6,267,207 B1 | * | 7/2001 | Fleischer et al. ........... | 188/162 |
| 6,276,497 B1 | * | 8/2001 | Severinsson ................ | 188/156 |
| 6,431,330 B1 | * | 8/2002 | Poertzgen et al. .......... | 188/156 |
| 6,666,305 B1 | * | 12/2003 | Vohla .......................... | 188/156 |
| 2004/0055838 | * | 3/2004 | Severinsson ................ | 188/171 |

FOREIGN PATENT DOCUMENTS

| | | |
|---|---|---|
| EP | 1 010 597 A2 | 6/2000 |
| GB | 2358896 A | 8/2001 |

* cited by examiner

Primary Examiner—Thomas Williams
(74) Attorney, Agent, or Firm—St. Onge Steward Johnston & Reens LLC

(57) ABSTRACT

Service braking of a vehicle can be carried out by way of a service brake actuator having an electric motor for applying its service brake. Energy from a loaded spring in a spring brake actuator connected to the service brake actuator can be released at will for supplying supplementary service brake energy to the service brake actuator.

8 Claims, 1 Drawing Sheet

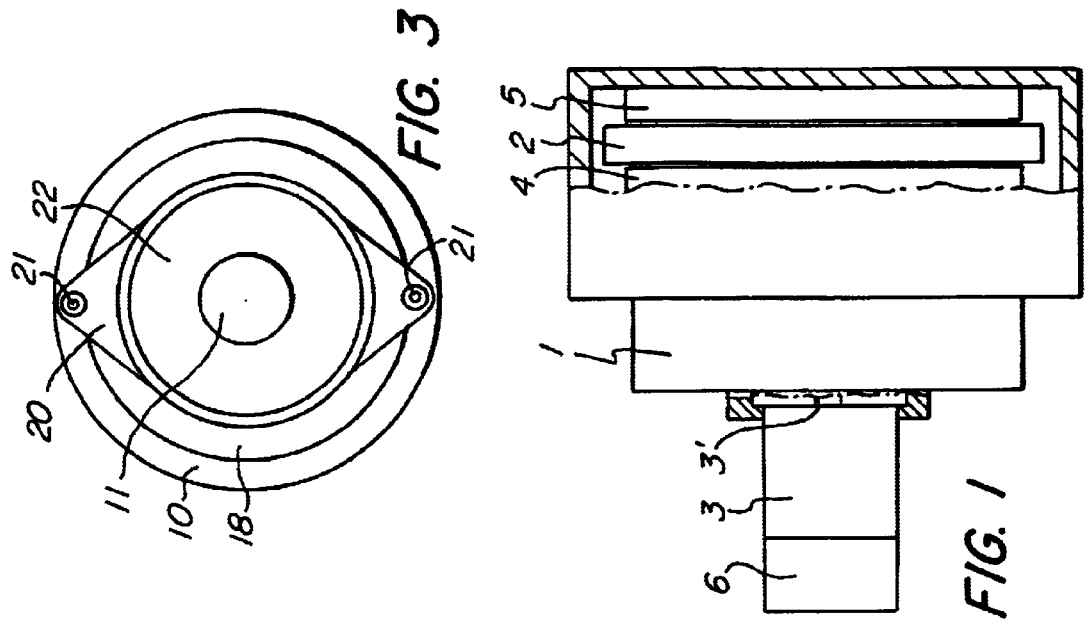
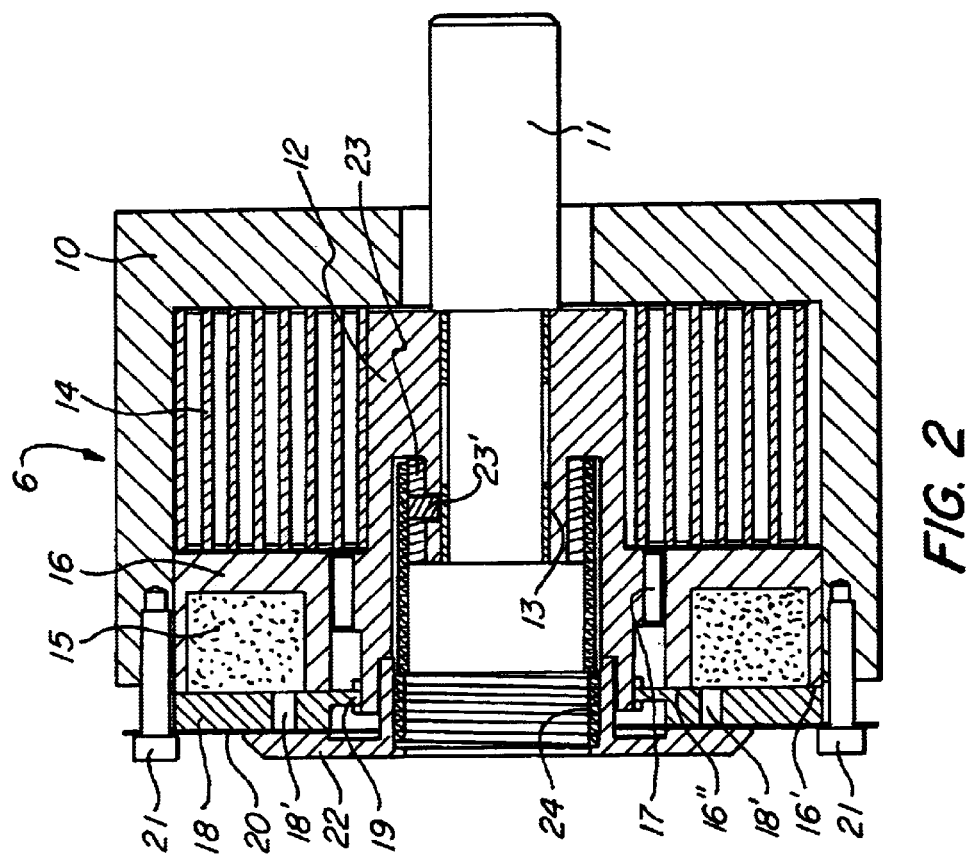

METHOD AND DEVICE FOR SERVICE BRAKING

This application is a continuation of pending International Patent Application No. PCT/SE01/02807 filed Dec. 18, 2001, which designates the United States and claims priority of pending Swedish Application No. 0004714-2 filed Dec. 20, 2000.

FIELD OF THE INVENTION

The present invention relates to a method and device for service braking a vehicle by means of a service brake actuator having a rotative motor, preferably an electric motor, as its service brake applying means.

BACKGROUND OF THE INVENTION

Traditionally, a vehicle—such as a car or a heavy road vehicle, but also a rail vehicle—is service braked by means of fluid actuated brake cylinders or actuators. The fluid is normally pressurized air for heavier road vehicles and hydraulic oil for lighter road vehicles.

For different reasons, much development work is presently devoted to designing brake systems where rotative brake energy, normally from electric motors, is transformed into linear, brake applying movements of brake linings or the like, cooperating with brake discs or brake drums of the vehicle.

For emergency and parking brake purposes a so called spring brake actuator can traditionally be connected to the service brake actuator. A powerful spring therein is normally held loaded or energized, and its energy can be released, normally through the service brake actuator, for the above purposes.

In each service brake arrangement the service brake actuator, i.e. in the present case the electric motor, has to be dimensioned for maximum brake applications, even used repeatedly during a short time span, but is normally only needed for delivering considerably less energy at normal brake applications. Investigations show in fact that maximum brake applications occur rarely.

The dimensions of the brake arrangements in the vehicle chassis are often critical, and it is accordingly desirable to minimize the dimension also of the service brake actuator.

The main object of the invention is thus to minimize the dimension of the service brake actuator without impairing the possibility to attain maximum brakings when needed.

THE INVENTION

This object is according to the invention attained in that energy from a loaded spring in a spring brake actuator connected to the service brake actuator is released at will for supplying supplementary service brake energy to the service brake actuator.

The service brake actuator may hereby be dimensioned to take care of 'normal" brake applications, whereas energy from the spring brake actuator is added when the needed energy is above the capacity of the service brake actuator. This means that the service brake actuator can be smaller and also cheaper. The function of the spring brake actuator to provide emergency and parking braking is not negatively influenced.

A device for carrying out the method according to the invention can include a spring brake actuator connected to the service brake actuator and containing a powerful spring and control means for controlled release of energy from the spring when loaded, supplementary to the service brake energy supply from the service brake actuator.

As the service brake actuator is of the rotative type, it is preferred to have a clock spring or spiral spring in the spring brake actuator, so that the delivery of energy therefrom is also rotative.

BRIEF DESCRIPTION OF THE DRAWINGS

A non-limiting example of a practical brake arrangement embodying the invention will be described in further detail below under reference to the accompanying drawing, in which FIG. 1 is a schematic illustration of a vehicle disc brake arrangement, FIG. 2 is a sectional view of a spring brake actuator in the brake arrangement of FIG. 1, and FIG. 3 is an end view from the left in FIG. 2 and to a smaller scale of the actuator of FIG. 2.

DETAILED DESCRIPTION OF THE DRAWINGS

A vehicle disc brake arrangement is shown in FIG. 1. A disc brake caliper 1 is mounted in a vehicle underframe (not shown) astraddle of a brake disc 2 on a vehicle axle (not shown). An electric motor 3 with a rotative drive shaft 3' is mounted in the caliper 1. Means, which are not further described here, are provided in the caliper 1 for transforming the rotative movement of the drive shaft 3' into a linear, brake applying movement of a first brake lining 4 for braking engagement with the brake disc 2. A second brake lining 5 is attached to the caliper 1.

The disc brake will accordingly be applied at the rotation of the electric motor 3 in one direction and released at the rotation in the opposite direction. The electric motor 3 thus acts as a normal service brake actuator.

The invention is concerned with a spring brake actuator 6, preferably for mounting on the electric motor 3, as is shown in FIG. 1. This actuator 6 can traditionally be used as a parking brake actuator and also as an emergency actuator. Also and in certain instances more importantly, the actuator 6 can be used for adding brake force at a service brake application.

The spring brake actuator 6 is shown in FIG. 2 (and also in an end view in FIG. 3).

The actuator 6 has a housing 10 for attachment to the end of the electric motor 3 in an appropriate way. An actuator shaft 11 is to be connected to the drive shaft 3' of the electric motor 3 and will accordingly rotate together therewith.

A generally cylindrical hub 12 is rotatably arranged on the shaft 11 by means of bushings 13. A strong clock spring or spiral spring 14 is arranged in the housing 10 coaxial with the shaft 11 with one of its ends attached to the housing 10 and the other end to the hub 12.

An electric coil 15 is arranged in a ring-shaped coil housing 16 attached in the housing 10. The coil 15 may be externally energized by an electric current at will. The hub 12 is journalled in the coil housing 16 by means of a bearing 17.

A brake disc 18 arranged axially outside the housing 10 and adjacent to the coil 15 is at 19 in splines engagement with the hub 12, so that the brake disc 18 rotates with the hub 12 but may move axially relative thereto.

A plate 20 is arranged externally of the brake disc 18 and is attached to the housing 10 by means of screws 21. A control disc 22 is in turn arranged externally of the plate 19.

There is a sleeve 23 with a pin 23' engaging a circumferential groove in the hub 12, so that a certain relative rotation of for example up to 15° between the hub 12 and the sleeve 23 may be admitted.

A locking spring 24 is arranged in such a way that its intermediate portion is in internal engagement with the shaft 11, its portion to the right in FIG. 2 in internal engagement with the sleeve 23 and its portion to the left in FIG. 2 in external engagement with the control disc 22.

The function of the device as shown and described is as follows:

Charging the Clock Spring 14

It is assumed that the clock spring 14 is in a relaxed state at the outset. The coil 15 is not energized.

At a release of the disc brake arrangement on which the spring brake actuator 6 is attached, the shaft 11 is rotated in a release direction. The locking spring 24 will transfer this rotation to the hub 12 and thus to the inner end of the clock spring 14 attached thereto—via the sleeve 23 and the pin 23'. Also the control disc 22 follows this rotation.

When a desired torque has been built up in the clock spring 14, the coil 15 is energized. Hereby a magnetic flux is formed attracting the brake disc 18 against end surfaces 16' and 16" of the coil housing 16, so that the rotation of the brake disc 18 is terminated by friction. This in turn means that the hub 12 is stopped.

By appropriate holes 18' in the brake disc 18 the magnetic flux is also diverted to the plate 20 and the control disc 22, which thus are attracted as well. This means that the control disc 22 is also rotationally locked.

The clock spring 14 is hereby charged or loaded for a future controlled delivery of rotational energy in the opposite rotational direction of the shaft 11 or in other words for application of the disc brake.

At a first rotational movement of the shaft 11 in the application direction the locking spring 24 will turn the sleeve 23, so that the pin 23' assumes its other position in relation to the hub 12.

Rotating the Shaft 11 Without Application of the Spring Brake Actuator 6

If the shaft 11 is rotated by the electric motor 3 for service application of the disc brake and with the coil 15 energized the locking spring 24 will follow the shaft 11 and slide internally on the sleeve 23 and externally in the control disc 22.

If on the other hand the shaft 11 is rotated in the opposite direction for service brake release the locking spring 24 is locked in the control disc 22, so that it has to slide internally in its intermediate portion against the shaft 11.

As long as the coil 15 is energized, normal service brake application and release by means of the service brake motor 3 is accordingly possible.

Applying the Spring Brake Actuator 6

When the coil 15 is deenergized, which may occur either at will for parking or service braking or for emergency braking when there is a disruption in the voltage supply, the friction engagement at 16' and 16" disappears, so that the brake disc 18 and the hub 12 start to rotate in the brake application direction under the action of the clock spring 14. As soon as the pin 23 has again shifted its position relative to the hub 12, also the sleeve 23 and the shaft 11 will follow the rotation by means of the locking spring 24.

After the spring brake application the above described operation for charging the clock spring 14 by rotation of the shaft 11 in the release direction and with the coil 15 deenergized will have to be repeated.

Modifications

In the preferred embodiment as described above and shown in the drawing, the spring brake actuator 6 is mounted on the electric motor 3 with its shaft 11 connected to the drive shaft 3' of the motor so as to rotate therewith. One obvious modification of the arrangement shown in FIG. 1 is to position the spring brake actuator between the caliper 1 and the electric motor 3. As another possible modification the spring brake actuator shaft may be connected to another rotating part in the disc brake caliper, where the rotational speed preferably is somewhat lower.

It has further to be pointed out that the service brake actuator 3 does not need to be an electric motor, but may quite as well be a pneumatic or hydraulic rotative motor. Also, the spring brake actuator 6 may be supplied with its energy for loading its spring from a rotating vehicle wheel.

The provision of the sleeve 23 with its pin 23' is only one example of a way to obtain the desired function of allowing free rotation of the shaft 11 in relation to the hub 12 in spite of the existence of the locking spring 24 for their rotational connection. Another example, which may be used in practice, is to delete said sleeve with its pin and to provide the hub 12 in the region for the locking spring 24 with a portion with a slightly reduced diameter.

The means in the spring brake actuator 6 for receiving and delivering energy has above been referred to as a shaft 11. However, the only really operative portion of the shaft 11 for the core function of the spring brake actuator is to the left in FIG. 2, where the engagement with the locking spring 24 occurs. This portion may for example be in the form of a sleeve with external connection to the left in FIG. 2. Such a modification is regarded to be within the scope of the claims. In such a modified actuator, some constructional changes would have to be made, such as the journalling of the hub 12.

Generally speaking, the shown and described embodiment may be changed in constructional details, for example with regard to the journalling of the different rotational parts. Also, the control disc 22 may be divided into two parts in splines engagement with each other.

The spring brake actuator can be provided with an indicator for example for energized and for applied brake.

The spring brake actuator has been described in its use as a parking and emergency actuator. As pointed out, it may also be used as a supplementary service brake actuator.

In this case the normal service brake actuator may be dimensioned to provide the power for normal brake applications, but when a higher power is needed, the power from the spring brake actuator may be added. In this way the service brake actuator may be given smaller dimensions.

What is claimed is:

1. A brake device for a vehicle comprising:
    a service brake actuator including a motor and a drive shaft connected to the motor and rotatable to apply a service brake operation;
    a spring brake actuator connected to the service brake actuator and containing a spring, the spring having a charged position storing energy therein and a released position for releasing the stored energy; and
    control means for controlled release of the stored energy from the spring in its charged position and applying a supplemental rotational energy to the drive shaft of the service brake actuator.

2. A brake device according to claim 1, wherein the spring in the spring brake actuator is a clock spring or spiral spring.

3. A brake device according to claim 2, wherein the clock spring of the spring brake actuator has an outer end attached to a spring brake actuator housing and mechanically charged at a rotation of an actuator shaft in a brake release direction.

4. A brake device according to claim 3, further comprising an electric coil for keeping—when electrically energized—the clock spring in its charged position, and transfer means for transferring the rotational energy of the clock spring to the actuator shaft in a brake applying direction, when the coil is de-energized, but allowing free rotation of the shaft in either direction, when the coil is energized.

5. A brake device according to claim 4, wherein the transfer means comprises a cylindrical hub disposed between the actuator shaft and the clock spring.

6. A brake device according to claim 5, wherein the transfer means further comprises a locking spring coupled with the actuator shaft and the cylindrical hub.

7. A device for service braking a vehicle by means of a service brake actuator having a rotative motor, as its service brake applying means;

wherein energy from a loaded spring in a spring brake actuator connected to the service brake actuator is released at will for supplying supplementary service brake energy to the service brake actuator;

wherein the device comprises the spring brake actuator connected to the service brake actuator and containing a powerful spring, and control means for controlled release of energy from the spring when loaded, supplementary to the service brake energy supply from the service brake actuator;

wherein the spring in the spring brake actuator is a clock spring or spiral spring;

wherein the spring brake actuator comprises:

the clock spring, attached at its outer end to a spring brake actuator housing and mechanically charged at a rotation of the an actuator shaft in a brake release direction;

an electric coil for keeping—when electrically energized—the clock spring in its charged condition; and transfer means for transferring the rotative energy of the clock spring to the actuator shaft in a brake applying direction, when the coil is deenergized, but allowing free rotation of the shaft in either direction, when the coil is energized.

8. A method for service braking a vehicle comprising:

providing a service brake actuator having a rotative motor as its service brake applying means, and a spring brake actuator connected to the service brake actuator and having a chargeable spring disposed in the spring brake actuator;

charging the spring in one rotational direction during a normal brake or release operation; and releasing the charged spring in another rotational direction for supplying supplementary service brake energy to the service brake actuator to apply a brake operation requiring an energy in excess of the normal brake operation or in an emergency situation.

* * * * *